United States Patent
Huang

[19]

[11] Patent Number: 5,806,877
[45] Date of Patent: Sep. 15, 1998

[54] ADJUSTABLE BACK STRUCTURE OF A STROLLER

[76] Inventor: Li-chu Chen Huang, No. 99, Fuchou 7th St., Chiayi City, Taiwan

[21] Appl. No.: 704,122

[22] Filed: Aug. 28, 1996

[51] Int. Cl.$^6$ ...................................................... B62B 9/12
[52] U.S. Cl. ........................................... 280/642; 280/47.4
[58] Field of Search ................................. 280/642, 643, 280/647, 650, 658, 47.38, 47.4; 297/354.12, 366, 367, 368, 369

[56] References Cited

U.S. PATENT DOCUMENTS

| | | | |
|---|---|---|---|
| 1,699,894 | 1/1929 | Klemm | 327/366 |
| 2,668,578 | 2/1954 | Pearman | 297/369 |
| 3,918,822 | 11/1975 | Rauschenberger | 297/354.12 |
| 4,805,928 | 2/1989 | Nakao et al. | 280/47.4 |
| 5,397,168 | 3/1995 | Hand | 297/367 |
| 5,524,969 | 6/1996 | Harrison et al. | 297/354.12 |
| 5,622,377 | 4/1997 | Shamie | 280/47.4 |
| 5,669,625 | 9/1997 | Cabagnero | 280/47.38 |

FOREIGN PATENT DOCUMENTS 0 479 132   4/1992   European Pat. Off. .............. 280/650

*Primary Examiner*—J. J. Swann
*Assistant Examiner*—Frank Vanaman
*Attorney, Agent, or Firm*—Miller, Sisson, Chapman & Nash, P.C.

[57] ABSTRACT

A stroller is provided to have an adjustable device for changing degree of inclination of a back seat. The adjustable device comprises an adjusting device and a seat back pivotally connected thereto. A user is able to use only one hand to change the inclined angle of the back seat through the linkage between the adjusting device and the backing racket of a tracking device.

3 Claims, 9 Drawing Sheets

ADJUSTABLE BACK STRUCTURE OF A STROLLER

FIELD OF THE INVENTION

The present invention generally relates to a stroller, and more particularly to a stroller having an adjustable back structure.

BACKGROUND OF THE INVENTION

Strollers having a braking system for parking rigidly, wheels for turning, means for adjusting an inclined angle of a back-pad and foldable means for storing the same have been widely used all over the world. By means of the above mentioned improved device, a user can provide a comfortable environment to a baby and convenience for herself/himself while walking outdoors.

Among those devices, the purpose of the back structure is to adjust the best angle for babies to sit or lie in the stroller in the most comfortable status, therefore, strollers of prior art are already equipped with angle adjusting abilities, one of which is disclosed in TW 2,427,64 filed on Mar. 1, 1994 and issued to Chan on Mar. 11, 1995. A stroller, as shown in FIG. 9, has two back adjusting devices each mounted on a back support 80. A seat 82 pivotally connected to the back support 80 is pivotally connected with a plate 83 which is pivotally connected to a rear support 81. A controller 84 having implanted resilient member (not shown) is thus provided at the connection of the seat 82 and the plate 83, such that the relative position of the seat 82 and the plate 83 is changed and the angle of the back support 80 is changed when the controller 84 is pressed downward. When the controller 84 is released, due to the implanted resilient member, it is again positioned. Because a cavity (not shown) defined in the plate 83 is directed to one direction, both hands of a user are required to readjust the angle of a back-pad from an upright position to an inclined position. Yet, the back-pad only needs to be pushed upward to recover to the upright position with only a singe hand.

All the back-pad adjusting devices in the market require both hands to do the adjustment, therefore, in the process of adjusting, this kind of stroller suffers several disadvantages, such as:

1. Inconvenience

It is very hard for one person holding a baby in one arm and using the other hand to adjust the back-pad adjusting device which requires both hands to do the adjustment.

2. Uncontrollability

Because using both hands to adjust the back-pad adjusting device simultaneously is an essential factor, the whole structure will suffer abnormal torsion to the structure of the stroller. Thus, the stroller having this kind of back-pad adjusting device mounted thereon may be torn apart after being used under such conditions.

Thus, the adjusting back structure of a stroller constructed in accordance with the present invention tends to mitigate and/or obviate the aforementioned problems.

SUMMARY OF THE INVENTION

The main objective of the invention is to provide an adjustable back device of a stroller. The stroller comprises a rear support, a seating support pivotally connected with the rear support, a seat back pivotally connected with the seating support, a front support pivotally connected with the seating support and a holding support which is also pivotally connected with the rear support. An adjusting device is pivotally connected between the rear support and the seat back for providing different angles for a baby staying within the stroller of the invention.

Another objective of the invention is to provide an adjustable back device which is able to be adjusted by means of only one hand.

Still another objective of the invention is to provide a means for guiding a transmission mechanism to activate the adjustable device.

Other objects, advantages and novel features of the invention will become more apparent from the following detailed description when taken in conjunction with the accompanying drawings.

BRIEF DESCRIPTION OF THE DRAWINGS

The present invention will now be better understood wish reference of the accompanying drawings wherein.

DETAILED DESCRIPTION OF THE PREFERRED EMBODIMENT

Figure 1:
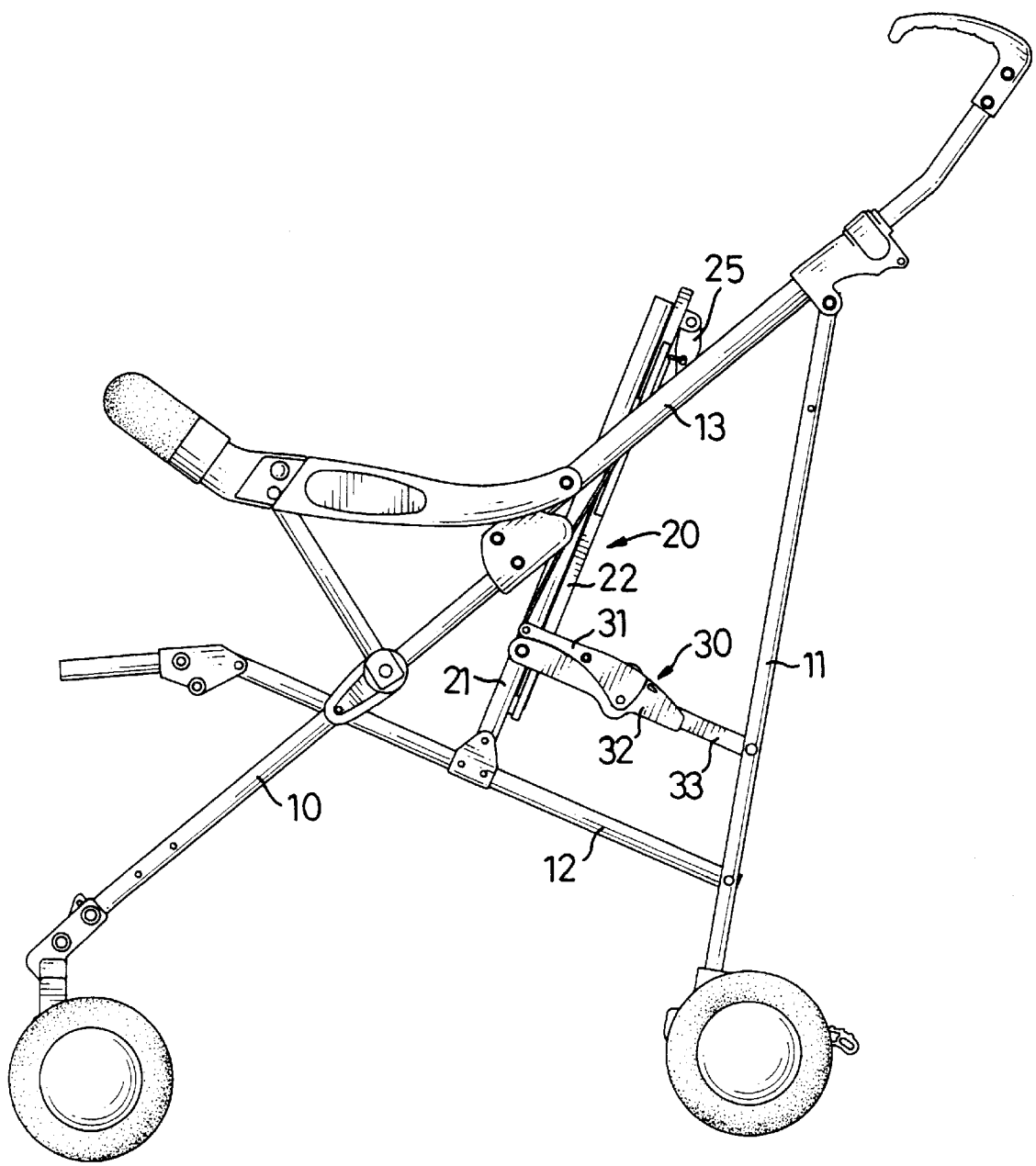
FIG. 1 is a side view of a stroller of the present invention.

Referring to FIG. 1, one preferred embodiment of the invention is shown. A stroller constructed in accordance with the present invention comprises a rear support 11, a seating support 12 pivotally connected with the rear support 11, a back-pad 20 pivotally connected with the seating support 12, a front support 10 pivotally connected with the seating support 12 and a holding support 13 which is also pivotally connected with the rear support 11. An adjusting device 30 is pivotally connected between the rear support 11 and the back-pad 20 for providing different angles to have different degrees of comfort.

Figure 2:
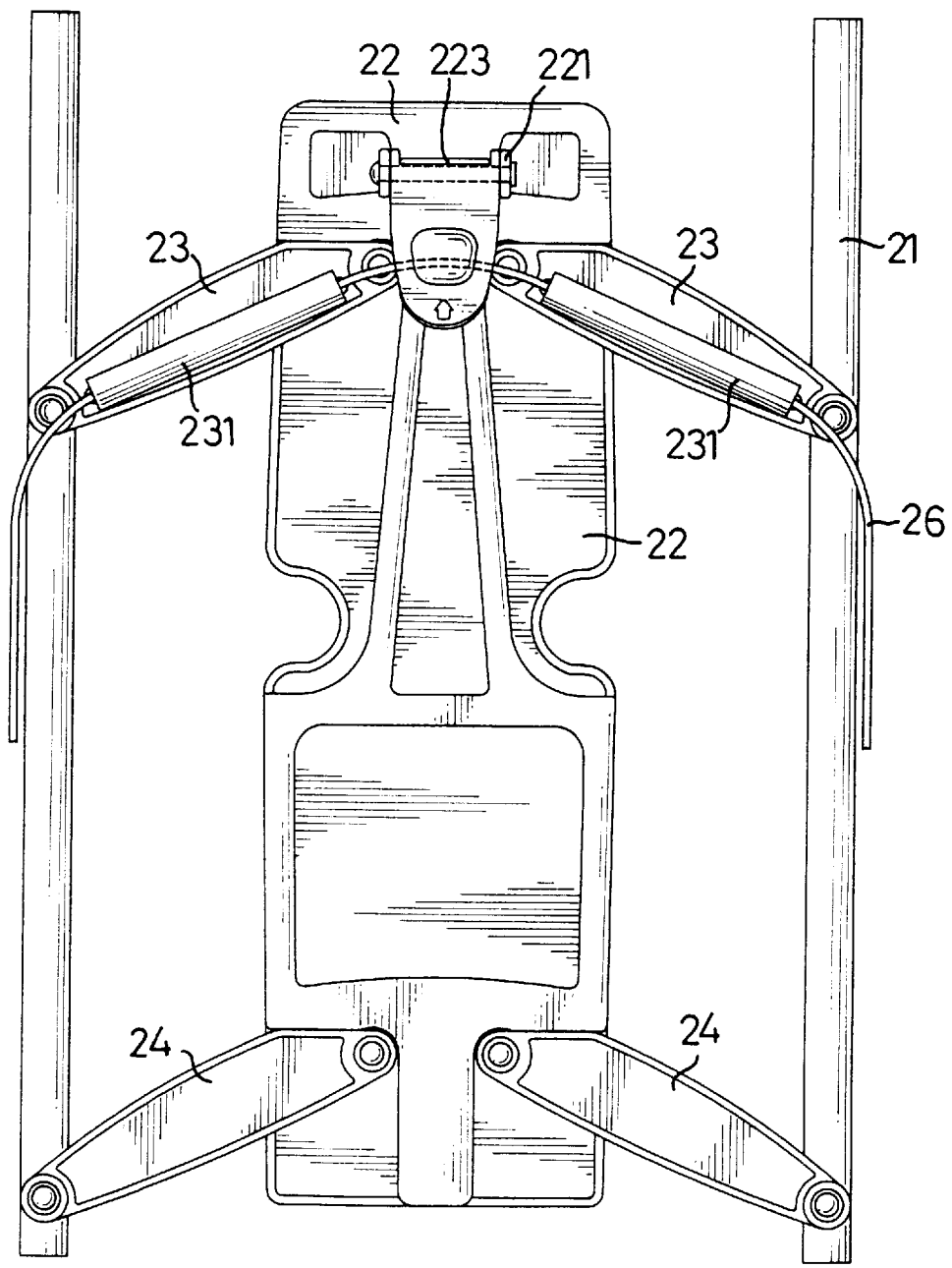
FIG. 2 is a schematic rear view of a seat back of the invention.
Figure 3:
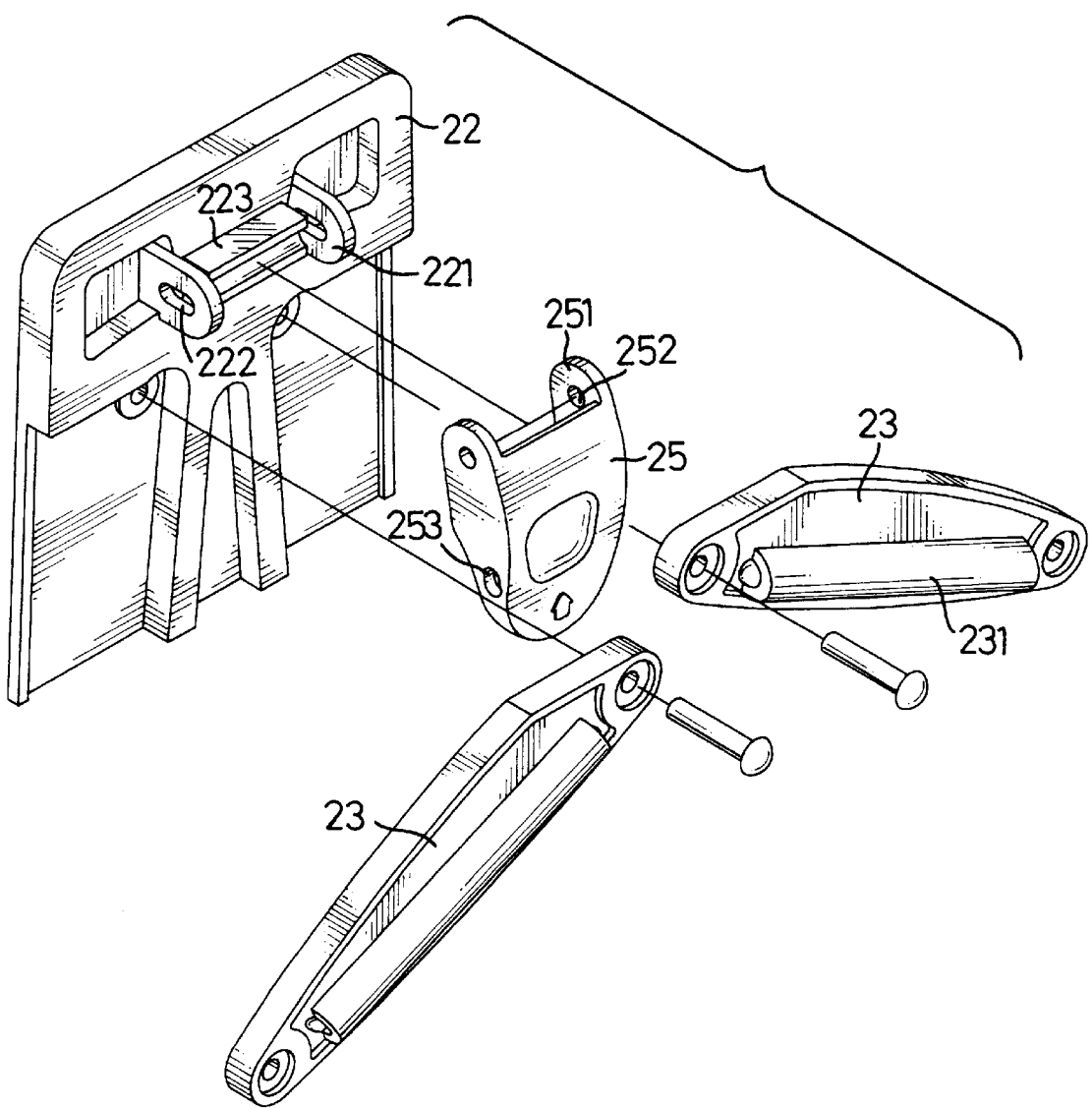
FIG. 3 is a partial exploded view of a back-pad.

Referring to FIGS. 2 and 3, a back-seat 22 of the back-pad 20 is pivotally connected between two back supports 21 via two upper controlling members 23 and two lower controller members 24 to meet the purpose of minimizing the volume of whole structure when the stroller is folded. Yet, since minimizing the volume of the stroller when in folded position is not within the scope of the invention, therefore it is not necessary to describe in any detail. An arcuate seat 223 is formed between two opposed lugs 221, and each lug has a first hole 222 defined therein and a gap is defined between the lugs 221 and the seat 223. An arcuate controller 25 has two extensions 251 respectively on both sides thereof and each of the extension 251 is provided with an upper hole 252 and a lower hole 253. When in combination, a rivet (not labeled) may be used to combine the controller 25 with the back seat 22 through the upper holes 252 of the controller 25 and the first hole 222 of the back seat 22 after the extension 251 is inserted into the gap between the lug 221 and the seat 223, and the rivet within the seat 223 acts as a support which will be described later. A tracking device 26 is inserted into the lower hole 253 of the controller 25 and a tunnel 231 defined on one side of each of the upper controlling members 23 and which guides and positions the tracking device 26.

Figure 4:
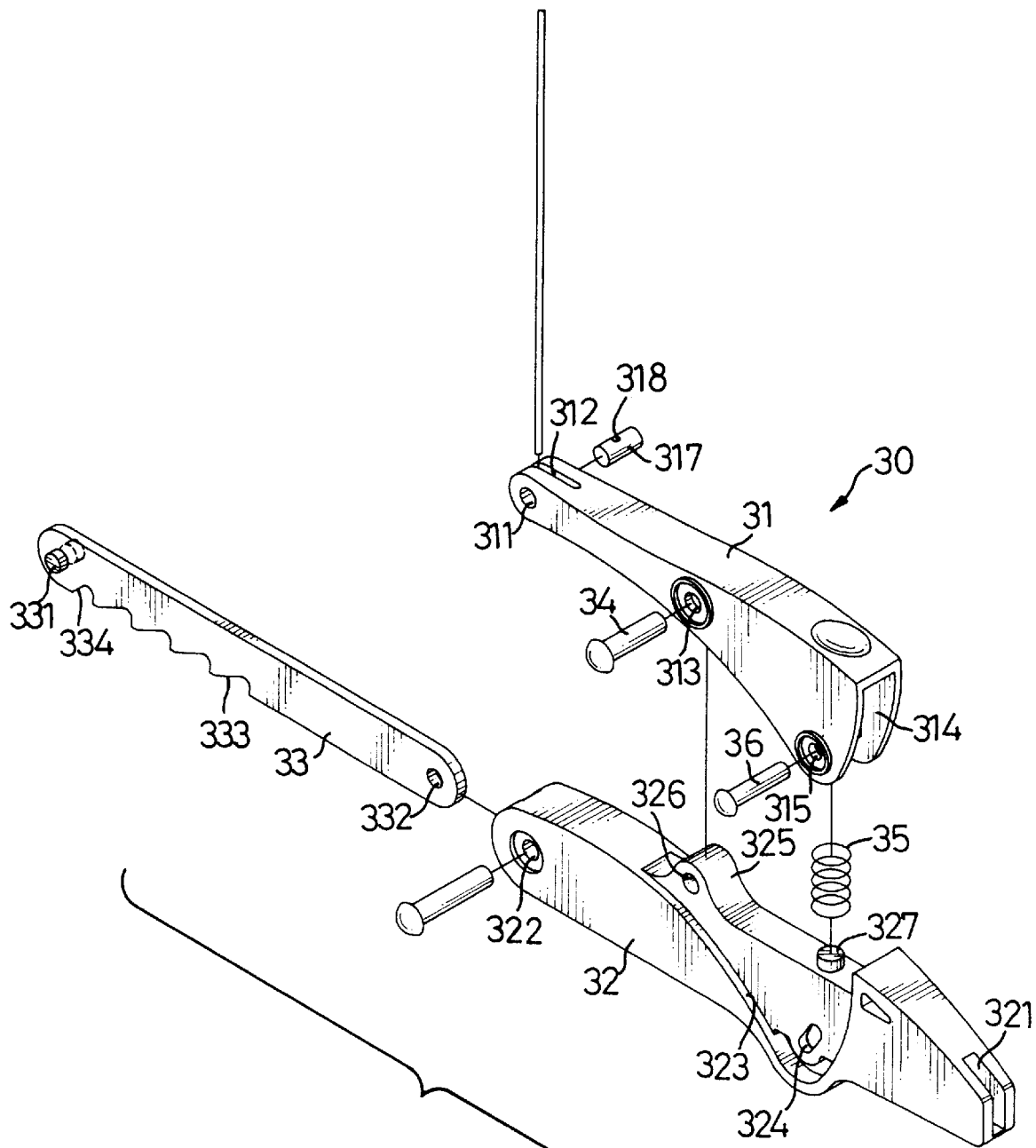
FIG. 4 is a schematic exploded view of an adjustable device.
Figure 5:
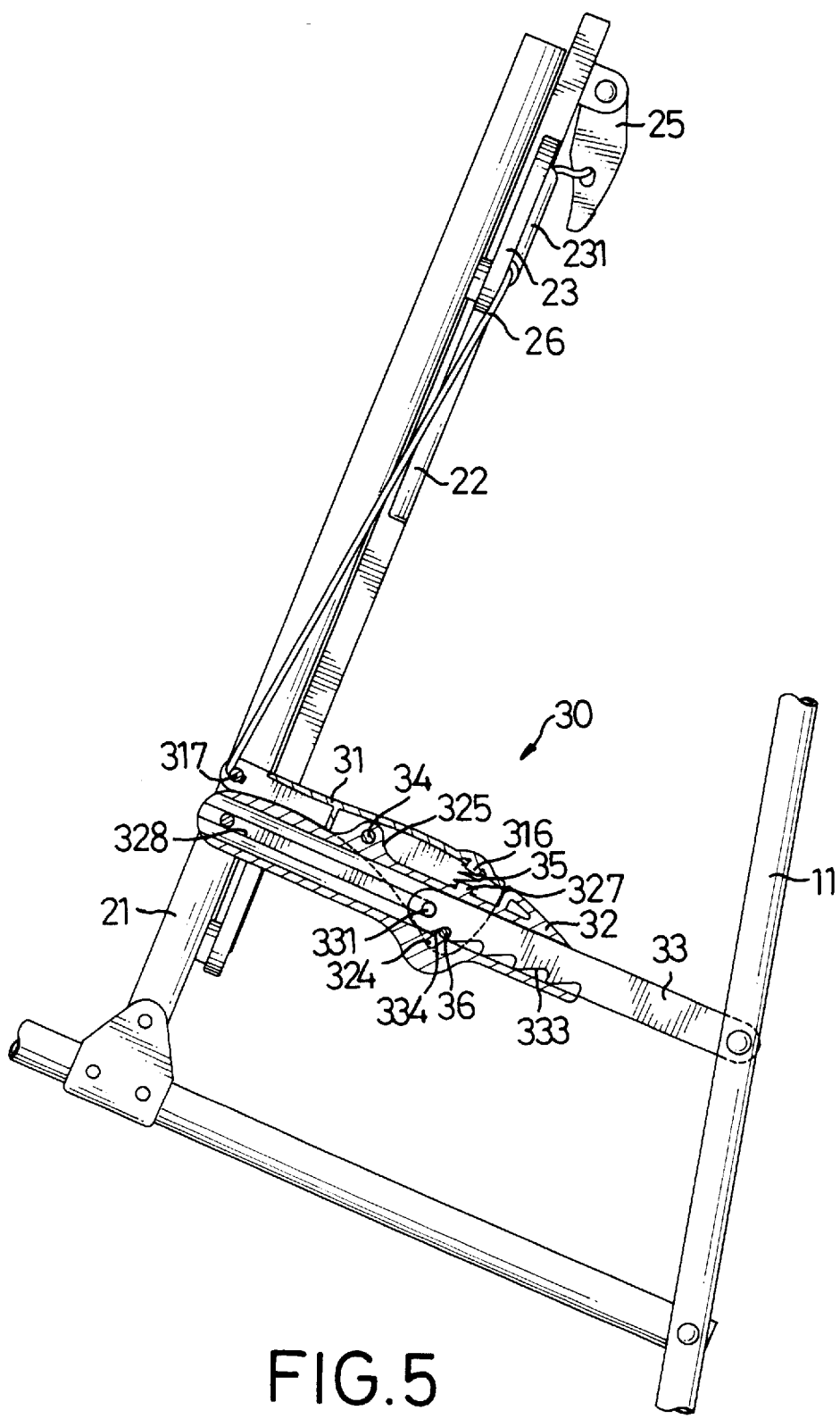
Fig. 5 shows the back-pad in a first degree of inclination.

Referring to FIGS. 4 and 5, the adjustable device 30 comprises a substantially "U" shaped positioning seat 31 having a first through hole 311 at a front end (not numbered) thereof, a slit 312 defined perpendicular to but communicating with the first through hole 311, a second through hole 313 defined at a middle section thereof, a third through hole 315 defined at a rear end thereof and a boss 316 formed on an under face 314 of the rear end and extending downward, a substantially "U" shaped support seat 32 having a passage 321 extending along an entire length of the support seat 32, a front through hole 322 defined at a front part thereof, a central cavity 323 defined on both right and left sides (not labeled) thereof, a central through hole 324 defined at the lower part of the central cavity 323, a projection 325 with an upper through hole 326 formed on an upper face (not labeled) thereof, a protuberance 327 formed at rear end (not labeled) thereof and two tracks 328 formed at the front part thereof and within the passage 321, an adjusting plate 33 having two protrusions 331 respectively formed on two opposite sides of a front section thereof and corresponding to the tracks 328 of the supporting seat 32, a rear through hole 332 defined at a rear section thereof and a series of inclined notches 333 defined on a lower face (not numbered) thereof. A first notch 334 of the series of notches 333 is configured to have a largest inclination. The adjusting plate 33 is inserted into and combined with the supporting seat 32 by the two protrusions 331 being received within the tracks 328, afterwhich, the adjusting plate 33 is pivotally connected with the positioning seat 31 and the supporting seat 32 via a first rivet 34 inserted into the second through hole 313 of the positioning seat 31 and the upper through hole 326 of the supporting seat 32. A resilient member 35 is positioned between the boss 316 of the positioning seat 31 and the protuberance 327 of the supporting seat 32 and a second rivet 36 is inserted into the third through hole 315 of the positioning seat 31 and the central through hole 324 of the supporting seat 32 and is received within the notches 333 or the first notch 334. Therefore, by the resilience of the resilient member 35, the rear part of the positioning seat 31 is maintained upward. A pin 317 having an opening 318 is inserted into the first through hole 311 of the positioning seat 31, and after the opening 318 is aligned with the slit 312 of the positioning seat 31, the positioning seat 31 and the pin 317 are combined through the tracking device 26 inserting through the first through hole 311 and the opening 318. The tracking device 26 is rigidly fixed at the front end of the positioning seat 31 after the aforementioned process is completed. Afterward, the whole structure will be the same as the one shown in FIG. 1 when the pivotal connection between the supporting seat 32 and the back support 21 and the pivotal connection between the adjusting plate 33 with the rear support 11 are completed.

FIG. 5 shows that the controller 25 is driven by the tracking device 26 which is rigidly fixed on the front end of the positioning seat 31, thus, when the controller 25 is lifted upward, the positioning seat 31 will also be lifted upward.

Figure 6:
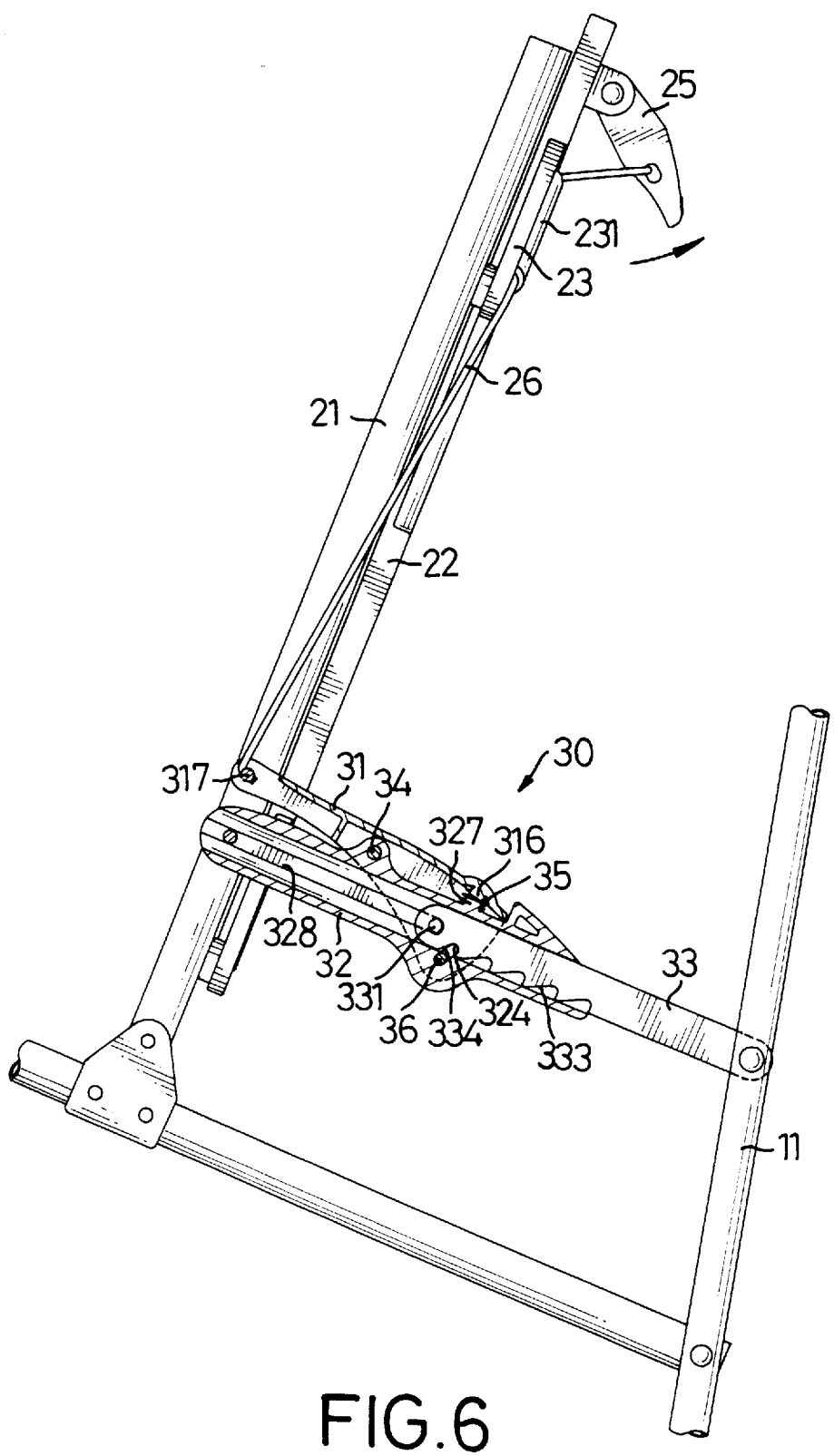
FIG. 6 shows the actuation of the adjustable device.
Figure 7:
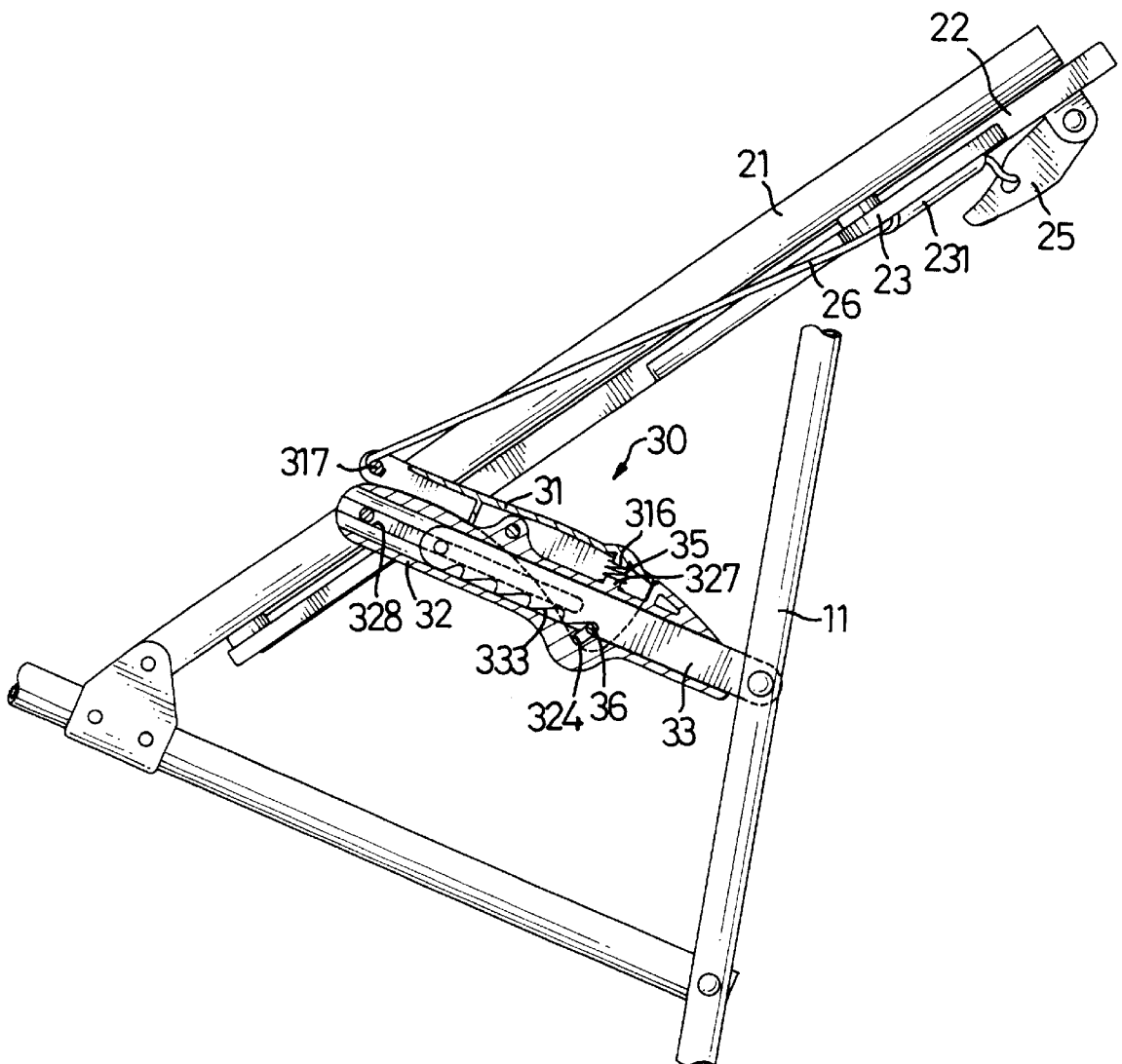
FIG. 7 shows the back-pad at a second degree of inclination.
Figure 8:
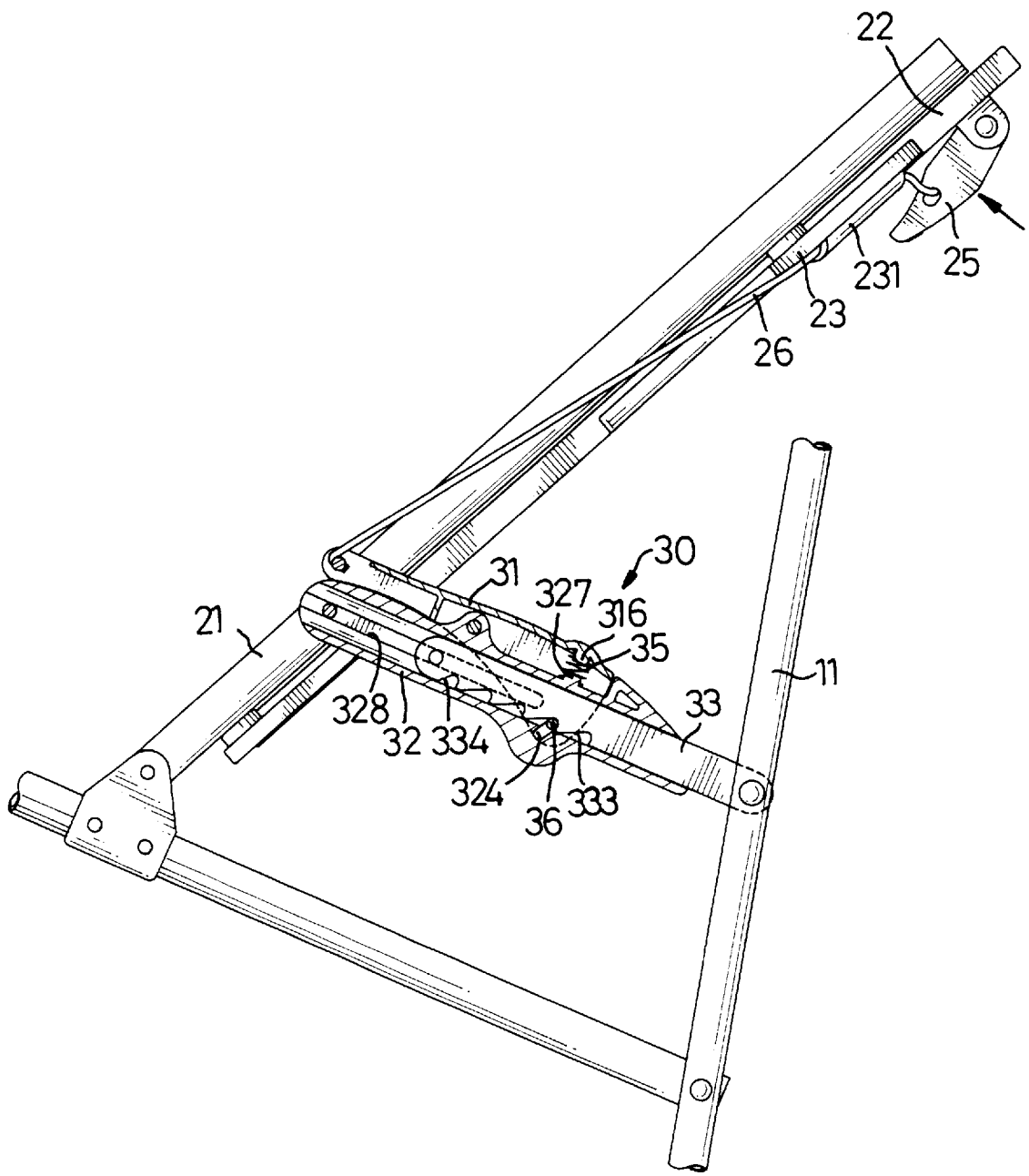
FIG. 8 shows the back-pad being advanced toward an upright position.
Figure 9:
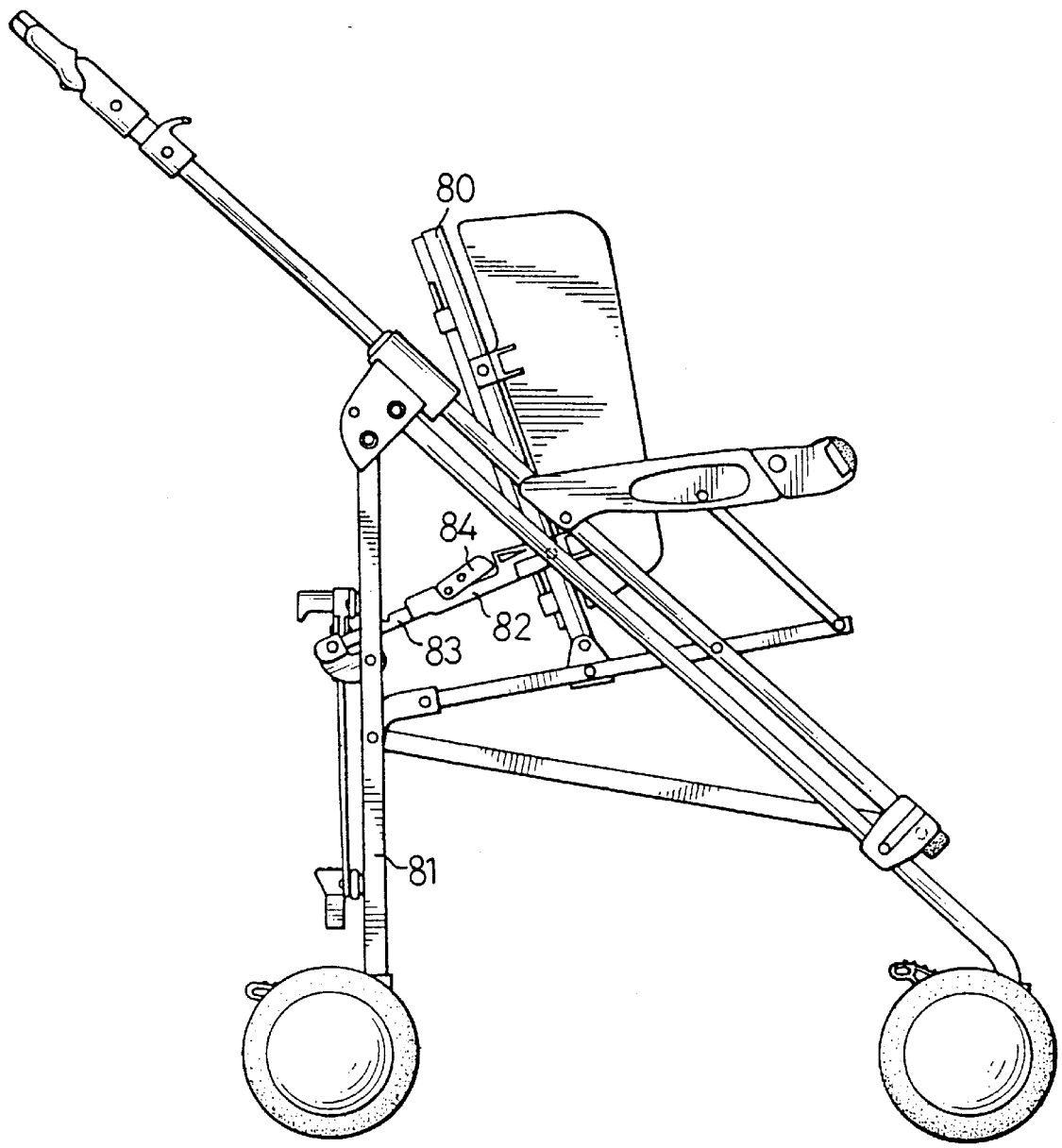
FIG. 9 is a schematic side view of a prior stroller.

FIG. 6 shows that using one hand to lift the controller 25 will result in the front end of the positioning seat 31 also being lifted upward, and because of the first rivet 34 rigidly fixed at the center, the rear end of the positioning seat 31 and the second rivet 36 are directed to travel downward. As a result, the second rivet 36 will leave the constraint of the notches 333 or the first notch 334, and the back-pad 20 is able to be pushed backward and achieve the purpose of adjustment of the inclined angle of the stroller, as shown in FIG. 7.

If the back-pad 20,is to be returned to a vertical position, due to the configuration of the notches or the first notch 334, the back-pad 20 only needs to be pushed forward, then the back-pad 20 is returned to a vertical position, as shown in FIG. 5.

From the previous discussion, it is noted that by the linkage of the controller 25, tracking device 26 and the positioning seat 31, a user will be able to adjust the inclination degree of the back-pad 20 of the stroller. Especially due to the tracking device 26, the tracking force of the user will be simultaneously transmitted to both sides of the stroller to adjust the adjusting device 30. Therefore, it is much easier to adjust the angle of the back-pad 20 of a stroller of the invention than the prior stroller which needs both hands to operate the angle adjustment.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. An adjustable back structure of a stroller comprising:
   a rear support, a seating support pivotally connected with said rear support, a back-pad pivotally connected with said seating support, a front support pivotally connected with said seating support, and a holding support pivotally connected with said rear support;
   an adjusting device pivotally connected between said rear support and said back pad, said adjusting device further comprising:
      a substantially U-shaped positioning seat having a first through hole defined at a front end thereof; a slit defined at an upper face of said front end and communicating with said first through hole, a second through hole defined at a middle section thereof; a third through hole defined at a rear end thereof; and a boss formed on an under face of said rear end and extending downward;
   a plurality of retaining means;
   a substantially U-shaped supporting seat further comprising:
      a passage defined through said supporting seat; a front through hole defined at a front part thereof; a central cavity defined on both right and left sides thereof for receiving said rear end of said positioning seat; a central through hole defined at the lower part of said central cavity aligned and pivotally connected with said third through hole of said positioning seat by said retaining means; a projection with an upper through hole defined in an upper face thereof, said upper through hole aligned and pivotally connected with said second through hole by said retaining means; a protuberance formed at a rear end thereof; and two tracks formed at said front part thereof and within said passage;
   an adjusting plate having two protrusions formed at a front section thereof and corresponding to said tracks of said supporting seat; a rear through hole defined at a rear section thereof and pivotally connected with said rear support; and a series of inclined notches defined on a lower face thereof;

a resilient member inserted between said boss of said positioning seat and said protuberance of said supporting seat;

an arcuate seat provided between two opposed lugs formed on said back pad, each said lug having a first hole defined therein and a space of a predetermined distance defined between said lug and said seat;

an arcuate controller having two extensions each extending on one of two sides thereof and each said extension provided with an upper hole and a lower hole, said controller and said back pad pivotally connected together by said retaining means through said first hole of said back pad and said upper hole of said controller;

a plurality of controlling members lateral to said controller and both sides of the lower part of said back pad and each having a tunnel mounted thereon; and a tracking device extending through said lower hole of said controller and said tunnel of said controlling member and connected to said front end of said positioning seat.

2. The device as claimed in claim 1, wherein said resilient member is a spring.

3. The device as claimed in claim 1, wherein said protrusions of said adjusting plate are slidably received within said track of said supporting seat.

* * * * *